Feb. 20, 1934.  W. G. SCHOENECK  1,947,743
COUPLING CONNECTION FOR ENSILAGE CONDUITS
Filed Dec. 18, 1931
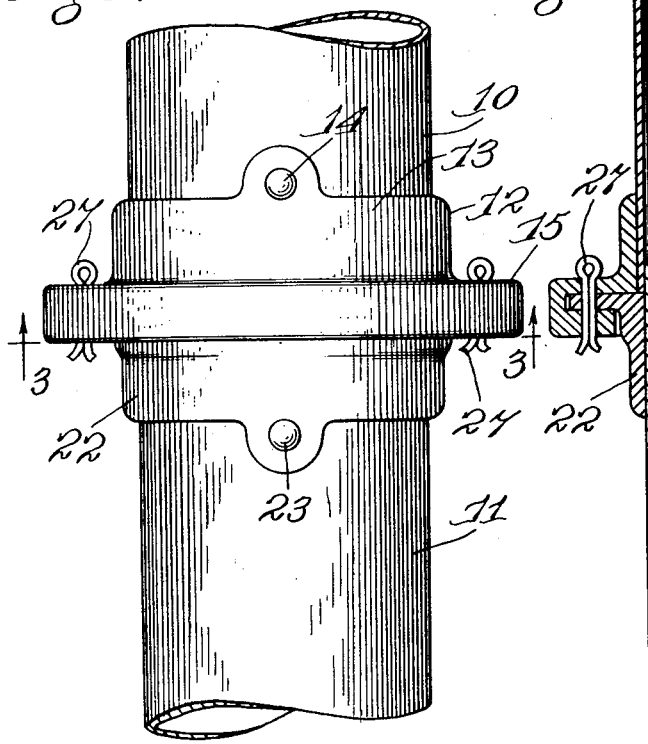
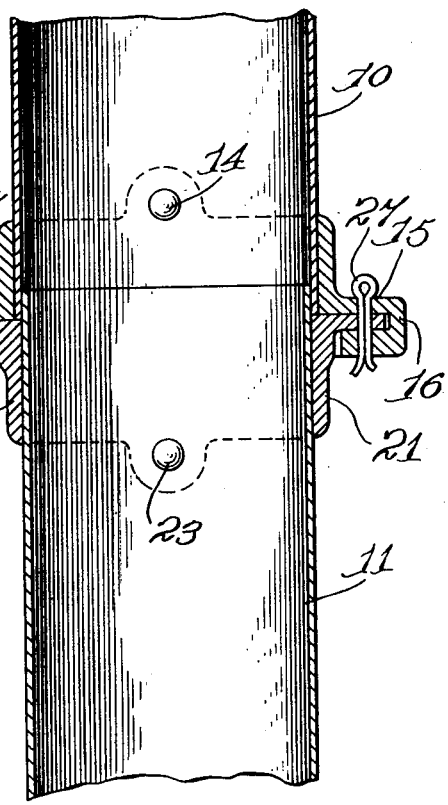
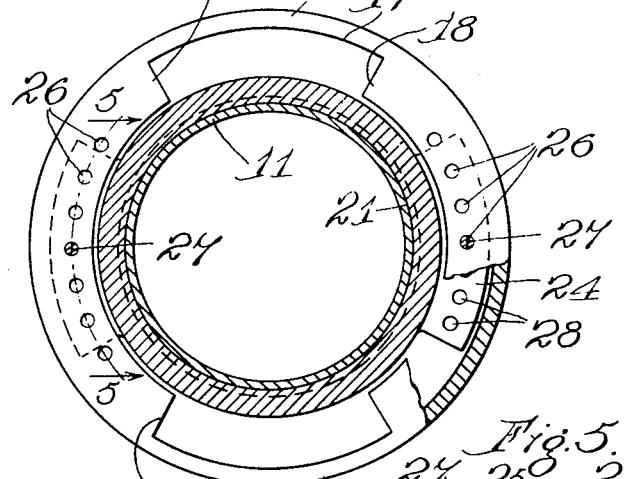
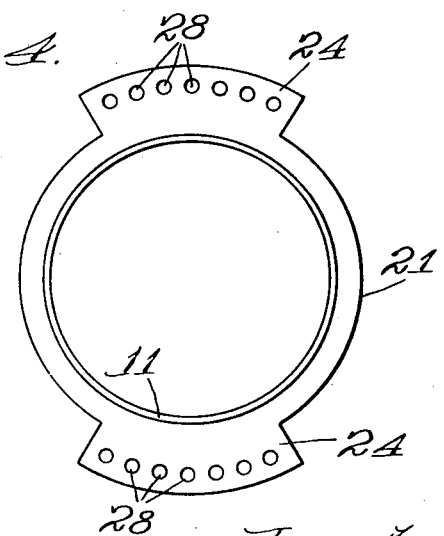
Inventor:
WALTER G. SCHONECK
By John P. Smith
Atty.

Patented Feb. 20, 1934

1,947,743

UNITED STATES PATENT OFFICE 1,947,743

COUPLING CONNECTION FOR ENSILAGE CONDUITS

Walter G. Schoeneck, Mokena, Ill.

Application December 18, 1931
Serial No. 581,865

1 Claim. (Cl. 285—175)

The present invention is directed generally to a pipe or conduit coupling, but more particularly to a coupling connection for securely connecting lengths of pipe or conduit for the purpose of conveying or elevating ensilage from the ensilage cutter to the top of a silo.

The primary object of the present invention is to provide a simple, efficient and rugged coupling connection between the different lengths of pipe or conduit for the conveyance of ensilage so that when the lengths of pipe are connected, they form in effect, a rigidly connected extension of pipe or conduit which is substantially air tight.

A further object of the invention is to provide a novel and improved pipe or conduit coupling which, when the adjacent lengths of pipe are connected, are rigidly secured together and prevented from displacement from each other.

These and other objects are accomplished by providing a construction and an arrangement of the various parts in the manner hereinafter described and particularly pointed out in the appended claim.

Referring to the drawing:

Fig. 1 is a side elevational view of the adjacent portion of two pipe or conduit lengths showing my improved coupling connection associated therewith;

Fig. 2 is a vertical cross sectional view of the coupling shown in Fig. 1;

Fig. 3 is a cross sectional view taken on the line 3—3 in Fig. 1;

Fig. 4 is a top plan view of the lower coupling member; and

Fig. 5 is a detailed cross sectional view taken on the arcuate line 5—5 in Fig. 3.

In illustrating one form of my invention, I have shown the same in connection with two adjacent lengths of pipe or conduits generally indicated by the reference characters 10 and 11. The upper end of each of these lengths of pipe 10 and 11 is smaller in diameter than the lower end so that the upper end thereof is capable of telescopically entering the other, or in other words, the upper end is adapted to fit snugly into the lower end of the next adjacent length of pipe or conduit as clearly shown in Fig. 2 of the drawing. The lower end of each length of pipe or conduit is provided with a coupling bracket generally indicated by the reference character 12 which is preferably in the form of an annular collar 13 and is secured to the lower end of each of the length of pipe or conduit by means of rivets 14. This coupling member 12 is provided with an annular and outwardly projecting flange 15. Formed integrally with the flange 15 is an annular wall 16 about the periphery of the flange 15 which forms in effect an annular recess 17 beneath the flange and annular wall 15 and 16 respectively. Formed integrally with and located on the opposite sides of the annular walls 16, are inwardly projecting arcuate flanges 18 which are adapted to support in the manner hereinafter described, a complementary coupling member secured to the upper end of the adjacent length of pipe or conduit. These two inwardly projecting arcuate flanges 18 are so arranged as to provide arcuate openings 19 for the reception of complementary coupling members hereinafter described. The upper surface of each of the arcuate and inwardly projecting flanges 18 have complementary beveled portions, as shown at 20, for the purpose hereinafter described. Secured to the adjacent or upper ends of the pipe or conduit 11 is a complementary coupling member generally indicated by the reference character 21 which is preferably in the form of an annular member or collar 22 and is secured to the pipe or conduit by means of rivets 23. This coupling member 21 is secured to the upper end of the pipe or conduit 11 at a point slightly below the upper end thereof as clearly shown in Fig. 2 so as to permit the upper end of the conduit 11 to telescopically fit into the inner surface or diameter of the upper conduit or pipe 10 as clearly shown in Fig. 2.

Formed on the opposite sides of the complementary coupling member 22 are outwardly projecting arcuate flanges 24 which have their lower surfaces oppositely beveled as shown at 25 so that these beveled surfaces may engage the beveled surface 20 of each of the complementary inwardly projecting arcuate flanges 18 of the coupling member 12 as clearly shown in Fig. 5 of the drawing. The flanges 24 are adapted to be inserted into the arcuate openings 19 in the coupling member 12 and revolved in a direction so as to engage the upper beveled surfaces 20 of each of the inwardly projecting flanges 18 in the manner clearly shown in Figs. 2 and 3 of the drawing.

By reason of these flanges 18 being beveled, as shown at 20, and engaging the beveled surfaces 25 of each of the arcute flanges 24, it will be readily seen that as one of these pipes or conduits is revolved with respect to the other, with the lower pipe telescopically positioned within the upper pipe, the beveled surface rigidly secures the abutting ends of these coupling members together so as to effect a rigid connection. When they are thus connected the annular flange 15 is provided with a plurality of openings or apertures 26 which may be arranged at different spacing relation with respect to each other so that the cotters 27 may be inserted through these apertures and through apertures 28 located in varying spaced relation on each of the flanges 24 for securely locking the coupling members together and preventing their displacement from each other.

From the above description it will be readily seen that I have not only provided a simple and efficient means for rigidly coupling the adjacent lengths of conduits or pipes together so as to secure in effect, a rigid pipe made of a number of lengths of conduits and one in which the coupling is substantially air tight.

While in the above specification I have described one embodiment which my invention may assume in practice, it will of course, be understood that the same is capable of modification and that modification may be made without departing from the spirit and scope of the invention as expressed in the following claim.

What I claim is my invention and desire to secure by Letters Patent is:

The combination with a plurality of lengths of conduits having one of their ends of relatively smaller diameter than the other, so that the adjacent ends of the connecting conduits are adapted to telescopically receive one another, of coupling members secured to the adjacent ends of said conduit, one of said coupling members having an outwardly projecting annular flange and a downwardly projecting annular wall formed integrally therewith, two oppositely disposed arcuate flanges extending inwardly from said wall, said second complementary member having outwardly and arcuately arranged flanges adapted to engage said inwardly projecting flanges of said first named coupling member, there being a plurality of apertures arcuately arranged in the flanges of each of said coupling members, and cotters adapted to be inserted in the registering apertures of each of said flanges for rigidly securing the adjacent ends of said conduit.

WALTER G. SCHOENECK.